United States Patent [19]
Sitar et al.

[11] Patent Number: 5,648,705
[45] Date of Patent: Jul. 15, 1997

[54] MOTOR VEHICLE ALTERNATOR AND METHODS OF OPERATION

[75] Inventors: Daryl Steven Sitar, Huntington Woods; Paul Theodore Momcilovich, Carleton; MD Abul Masrur, W. Bloomfield; Feng Liang, Canton; Garold Paul Myers, Northville; Shahram Zarei, Farmington Hills, all of Mich.

[73] Assignee: Ford Motor Company, Dearborn, Mich.

[21] Appl. No.: 523,761

[22] Filed: Sep. 5, 1995

[51] Int. Cl.[6] .............................. H02P 9/00; H02M 7/219
[52] U.S. Cl. .............................. 318/145; 322/20; 363/132
[58] Field of Search .................................. 318/140, 141, 318/145, 254; 290/4 B; 322/17, 20, 25, 28; 363/74, 76, 77, 80, 127, 131, 132

[56] References Cited

U.S. PATENT DOCUMENTS

| | | | |
|---|---|---|---|
| 4,479,082 | 10/1984 | Schauder et al. | 318/799 |
| 4,496,897 | 1/1985 | Unnewehr et al. | |
| 4,767,976 | 8/1988 | Mutoh et al. | 318/308 |
| 4,771,224 | 9/1988 | Elms | 318/809 |
| 4,788,485 | 11/1988 | Kawagishi et al. | 318/811 |
| 4,912,378 | 3/1990 | Vukosavic | 318/254 |
| 5,038,092 | 8/1991 | Asano et al. | 318/811 |
| 5,144,178 | 9/1992 | Sugiura. | |
| 5,250,890 | 10/1993 | Tanamachi et al. | 318/811 |
| 5,255,175 | 10/1993 | Uchino | 363/81 |
| 5,266,836 | 11/1993 | Sousa | 290/31 |
| 5,285,144 | 2/1994 | Hsu et al. | 318/807 |
| 5,325,042 | 6/1994 | Murugan | 322/10 |
| 5,408,067 | 4/1995 | Crouse | 219/137 PS |

FOREIGN PATENT DOCUMENTS

| | | |
|---|---|---|
| 0 665 637 | 1/1995 | European Pat. Off. . |
| 3432128 A1 | 3/1985 | Germany . |

*Primary Examiner*—Bentsu Ro
*Attorney, Agent, or Firm*—Roger L. May; Mark S. Sparschu

[57] ABSTRACT

A conventional full wave diode bridge of an alternator is replaced with a full wave controlled rectifier bridge having controlled switches in place of diodes. Phase control is performed by the switches of the controlled rectifier bridge to preempt natural commutation and shift the phase of the alternator phase voltages relative to the phase currents. The phase angle control disrupts the normal unity power factor operation of the alternator and causes additional reactive current flow in a three phase stator winding of the alternator to source the controlled rectifier bridge. The result is that for the same operating conditions the controlled switches of the controlled rectifier bridge boost output from the alternator by from 40% to 60%.

6 Claims, 5 Drawing Sheets

| MODE | TIME INTERVAL | CONNECTION | TERMINAL VOLTAGE | |
|---|---|---|---|---|
| 1<br>A+<br>B−<br>C+<br>ON | $0 < \omega_e t < \frac{\pi}{3}$ |  | $V_{ab}=V_{dc}$<br>$V_{bc}=-V_{dc}$<br>$V_{ca}=0$ | $V_{an}=\frac{V_{dc}}{3}$<br>$V_{bn}=-\frac{2V_{dc}}{3}$<br>$V_{cn}=\frac{V_{dc}}{3}$ |
| 2<br>A+<br>B−<br>C−<br>ON | $\frac{\pi}{3} < \omega_e t < \frac{2\pi}{3}$ |  | $V_{ab}=V_{dc}$<br>$V_{bc}=0$<br>$V_{ca}=-V_{dc}$ | $V_{an}=\frac{2V_{dc}}{3}$<br>$V_{bn}=-\frac{V_{dc}}{3}$<br>$V_{cn}=-\frac{V_{dc}}{3}$ |
| 3<br>A+<br>B+<br>C−<br>ON | $\frac{2\pi}{3} < \omega_e t < \pi$ |  | $V_{ab}=0$<br>$V_{bc}=V_{dc}$<br>$V_{ca}=-V_{dc}$ | $V_{an}=\frac{V_{dc}}{3}$<br>$V_{bn}=\frac{V_{dc}}{3}$<br>$V_{cn}=-\frac{2V_{dc}}{3}$ |
| 4<br>A−<br>B+<br>C−<br>ON | $\pi < \omega_e t < \frac{4\pi}{3}$ |  | $V_{ab}=-V_{dc}$<br>$V_{bc}=V_{dc}$<br>$V_{ca}=0$ | $V_{an}=-\frac{V_{dc}}{3}$<br>$V_{bn}=\frac{2V_{dc}}{3}$<br>$V_{cn}=-\frac{V_{dc}}{3}$ |
| 5<br>A−<br>B+<br>C+<br>ON | $\frac{4\pi}{3} < \omega_e t < \frac{5\pi}{3}$ |  | $V_{ab}=-V_{dc}$<br>$V_{bc}=0$<br>$V_{ca}=V_{dc}$ | $V_{an}=-\frac{2V_{dc}}{3}$<br>$V_{bn}=\frac{V_{dc}}{3}$<br>$V_{cn}=\frac{V_{dc}}{3}$ |
| 6<br>A−<br>B−<br>C+<br>ON | $\frac{5\pi}{3} < \omega_e t < 2\pi$ |  | $V_{ab}=0$<br>$V_{bc}=-V_{dc}$<br>$V_{ca}=V_{dc}$ | $V_{an}=-\frac{V_{dc}}{3}$<br>$V_{bn}=-\frac{V_{dc}}{3}$<br>$V_{cn}=\frac{2V_{dc}}{3}$ |

FIG-8

MOTOR VEHICLE ALTERNATOR AND METHODS OF OPERATION

BACKGROUND OF THE INVENTION

The present invention relates generally to alternators and, more particularly, to improved alternators and methods for operating such alternators to improve alternator output current particularly at lower speeds. While the present invention is generally applicable, it will be described herein with reference to use in motor vehicles.

A conventional motor vehicle alternator includes a three phase stator winding with a rotor magnetically coupled to the stator and driven by the vehicle's internal combustion engine. As the rotor is driven, three phase power, generated at output connections of the stator winding, is rectified by a three phase diode rectifier bridge. Unfortunately, the output current and efficiency, both mechanical and electrical, of the alternator vary with the speed of the engine which is controlled for the mechanical requirements of the vehicle. At low speeds, the alternator output may be insufficient to provide the power needed to operate all electrical equipment of the vehicle while at high speeds, power generation is sufficient to far exceed these requirements.

The operating speed of an alternator used in the electrical system of a motor vehicle may be varied to overcome the noted inconsistencies between power generation and power requirements and to advantageously generate sufficient power for the motor vehicle when the engine is operating at a low speed. For example, a variety of two speed alternators operable at a higher speed for low speed operation of the corresponding motor vehicle engine are known.

While such alternator control arrangements are useful in providing adequate power at low engine speeds or for protecting alternators at high engine speeds, they rely on mechanical speed change devices which can be unreliable.

Accordingly, there is a need for an improved alternator which is reliable and does not rely on mechanical speed changing devices to improve alternator operation and arrangements for controlling operation of such an alternator for example in a motor vehicle.

SUMMARY OF THE INVENTION

This need is met by the invention of the present application wherein a conventional full wave diode bridge of an alternator is replaced with a full wave controlled rectifier bridge having controlled switches in place of diodes. Phase control is performed by the switches of the controlled rectifier bridge to preempt natural commutation and shift the phase of the alternator phase voltages relative to the phase currents. The phase angle control disrupts the normal unity power factor operation of the alternator and causes additional reactive current flow in a three phase stator winding of the alternator to source the controlled rectifier bridge. The result is that for the same operating conditions, the controlled switches of the controlled rectifier bridge boost output from the alternator by from 40% to 60%.

In accordance with one aspect of the present invention, an alternator is mechanically driven to generate a direct current (dc) output, for example by an internal combustion engine of a motor vehicle to charge a battery of the motor vehicle and operate electrical equipment of the motor vehicle. The alternator comprises a three phase stator winding having three output connections. A rotor is magnetically coupled to the stator winding and mechanically driven to generate a back electromotive force in the stator winding and thereby produce three phase power at the three output connections of the stator winding. Apparatus is used in conjunction with known machine parameters to calculate or otherwise determine the electrical position of the back electromotive force in the stator winding. A full wave controlled rectifier bridge is connected between the three output connections of the stator winding and the load, for example a battery and electrical equipment of a motor vehicle. The full wave controlled rectifier bridge is controlled in response to the back electromotive force in the stator winding to control phase shift between the back electromotive force in the stator winding and phase voltages at the three output connections of the stator winding.

In accordance with another aspect of the present invention, a method of operating an alternator mechanically driven for example by an internal combustion engine of a motor vehicle to charge a battery of the motor vehicle and operate equipment of the motor vehicle, the alternator including a three phase stator winding having three output connections and a rotor magnetically coupled to the stator winding and mechanically driven to generate a back electromotive force in the stator winding and thereby produce three phase power at the three output connections of the stator winding, comprises the steps of: determining the position of the back electromotive force in the stator winding; connecting a full wave controlled rectifier bridge between the three output connections of the stator winding and the battery of the motor vehicle; and, controlling the full wave controlled rectifier bridge to control phase shift between the back electromotive force in the stator winding and phase voltages at the three output connections of the stator winding in response to the determined back electromotive force in the stator winding.

It is, thus, a feature of the present invention to provide an improved alternator for generating a dc output and a method of operating the alternator which provides improved alternator output current, particularly at lower speeds; to provide an improved alternator for a motor vehicle and a method of operating the alternator which provides improved alternator output current, particularly at lower engine speeds; and, to provide an improved alternator for a motor vehicle and a method of operating the alternator which provides improved alternator output current, particularly at lower engine speeds by controlling a full wave controlled rectifier bridge to control the phase shift between back electromotive force and phase voltage to increase output current from the alternator.

Other features and advantages of the invention will be apparent from the following description, the accompanying drawings and the appended claims.

DETAILED DESCRIPTION OF THE INVENTION

Figure 1:
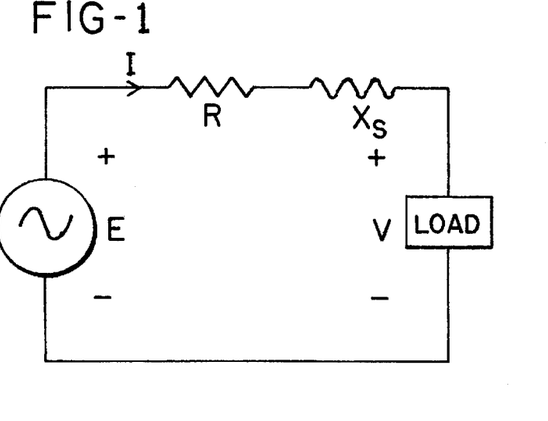
FIG. 1 is a schematic diagram of a single phase of a synchronous machine.

Prior to description of the present invention, a brief analysis of synchronous machines will be made to provide technical background for the description of the alternator control method and apparatus of the present invention. FIG. 1 is a schematic diagram of a model for a single phase of a synchronous machine with uniform air gap wherein: E is the voltage or back electromagnetic force (EMF) generated in the phases of the stator winding by a rotating flux wave produced by a driven rotor which is magnetically coupled to the stator winding; I is the current expressed or referred to alternating current (ac) quantities flowing to the load which, for a motor vehicle, comprises a battery and selectively activated electrically operated devices of the motor vehicle; R is the resistance of the phase of the stator winding; Xs is the synchronous reactance of the phase of the stator winding; and, V is the load voltage expressed or referred to ac quantities.

Figure 2:
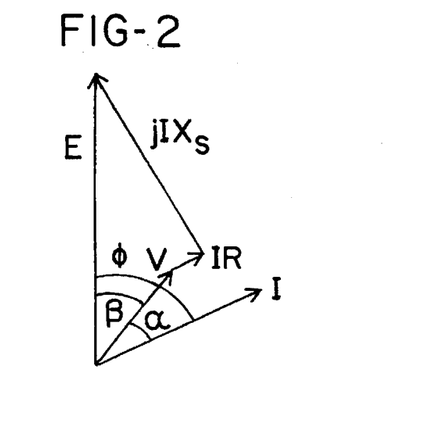
FIGS. 2–5 are phasor diagrams illustrating various electrical parameters of the synchronous machine of FIG. 1.

FIG. 2 is a phasor diagram for the synchronous machine model of FIG. 1 wherein $\phi$ is the angle between the EMF E and the current I, $\beta$ is the angle between the EMF E and the load voltage V, and $\alpha$ is the angle between the load voltage V and the current I. The power transferred from the rotor to the stator, air gap power, is given by the equation:

$$P = EI \cos(\phi)$$

Figure 3:
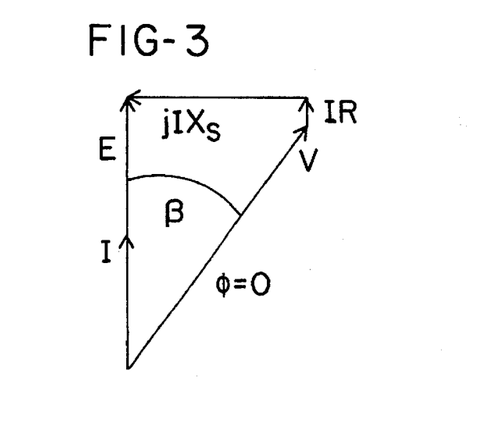

Given the back EMF E, limited by the speed and flux, and current I, limited by the cooling conditions of the machine, maximum air gap power is obtained if the current I is in phase with the back EMF E, commonly referred to as field oriented, and accordingly, the machine operates at maximum power. In this operating mode, the machine has highest power density. Unfortunately, such operating mode cannot be achieved in a conventional motor vehicle charging system because in this operating mode the terminal voltage is usually higher than the back EMF, as shown in FIG. 3, while the terminal voltage is smaller than the back EMF in a conventional motor vehicle charging system.

Figure 4:
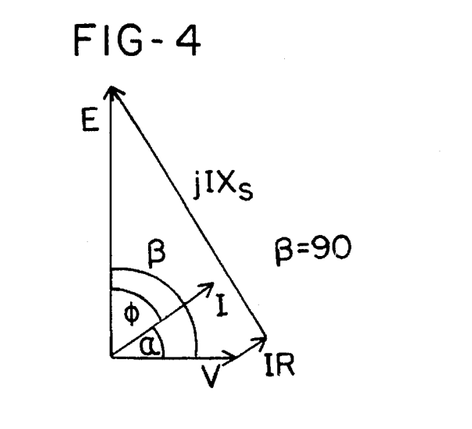
Figure 5:
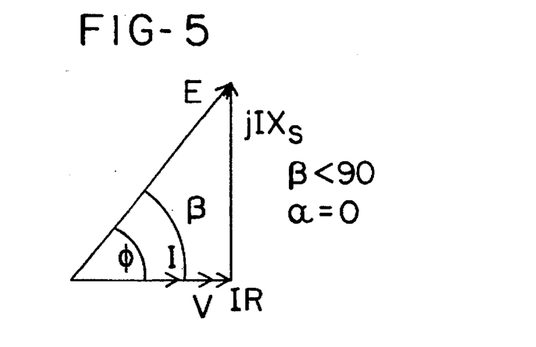

In a motor vehicle charging system, the constraints are the terminal voltage, determined by the battery voltage, and the back EMF. According to synchronous machine theory, under such constraints the power will be maximum if the phase shift between the back EMF and the terminal voltage is 90 electrical degrees for uniform air-gap machines, as shown in FIG. 4. Unfortunately, a synchronous machine connected to a diode rectifier can not produce maximum output power because the angle $\beta$ is less than 90° due to the fact that the diodes force the phase current to be in phase with phase voltage, as shown in FIG. 5.

It can be seen that by increasing the angle between the back EMF and the terminal voltage, the output of a synchronous machine can be increased. However, the increase in the output dc current is smaller than the increase in the phase current because the machine has lower power factor when the current is not in phase with the phase voltage. In accordance with the present invention, a full wave controlled rectifier bridge is used to control the angle $\beta$ between the EMF and the load voltage by manipulating the connections of the terminal voltage of the synchronous machine or alternator. This control increases the output of the alternator, particularly at low speeds, and can also be used to control overvoltage, i.e., load dump, and voltage regulation within the charging system of a motor vehicle, see FIG. 9.

Since the battery is a voltage source, the voltages applied to the output connections of the stator winding of the alternator are directly controlled by the full wave controlled rectifier bridge rather than the phase currents of the machine. Accordingly, the control for the controlled rectifier bridge is to synthesize ac terminal voltages such that the synthesized terminal voltages interact with the back EMF to produce required current flow. The requirements for the synthesized terminal voltages are as follows. 1) The frequency of the synthesized terminal voltages must be the same as that of the back EMF otherwise the machine will not have any average output power. 2) The magnitude of the terminal voltage should be the possible maximum, which is limited by the battery voltage, for the machine to have highest possible output with a given field current. 3) The angle between the phase voltage and the corresponding back EMF should be such that the machine will provide the current demanded, not necessarily the maximum all the time.

There are several known methods to synthesize the terminal voltages such as sine-triangle PWM, voltage space vector PWM and six-step control. Six-step control produces the highest fundamental component voltage and it is also simple to implement. However, it has larger low-order harmonic components compared with the other control methods. Because the base frequency of an alternator of a motor vehicle charging system is quite high, greater than 150 Hz, the harmonic voltage components do not generate sufficiently large harmonic currents to be a problem if six-step control is used. Accordingly, due to its simplicity and higher fundamental voltage, six-step control is preferred for the alternator control system of the present application.

Figure 6:
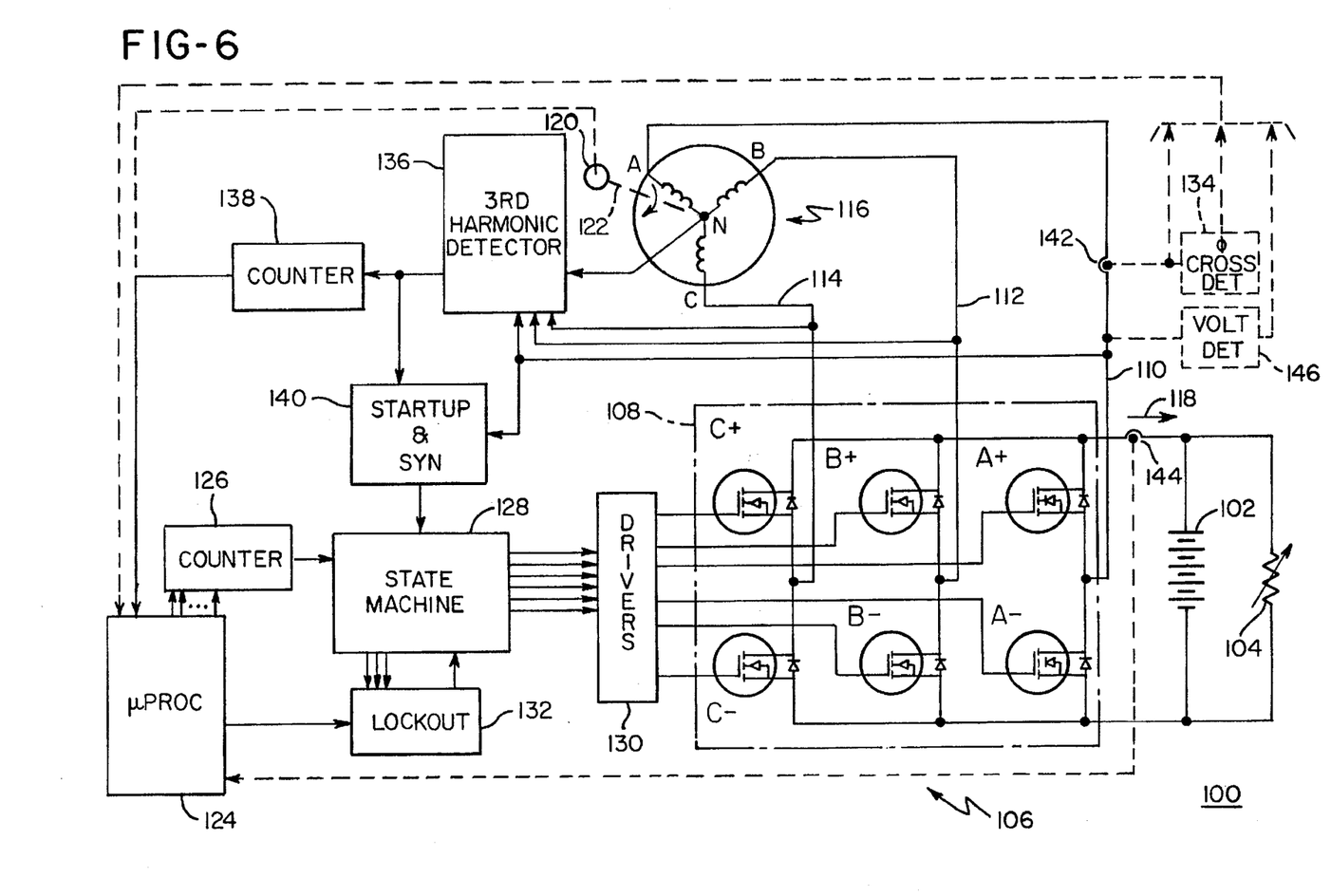
FIG. 6 is a schematic block diagram of a motor vehicle electrical system including an alternator operable in accordance with the present invention.

FIG. 6 is a schematic block diagram of a motor vehicle electrical system 100 including a battery 102, a load 104 made up of selectively activated electrically operated devices of the motor vehicle and an alternator 106 operable in accordance with the present invention. A full wave controlled rectifier bridge 108 is constructed using six switches which are illustrated as six MOSFETs A+, A−, B+, B−, C+, C−, of course a variety of controlled switch devices can be used in the present invention as will be apparent to those skilled in the art. The six switching modes used for six-step control of the corresponding connections and the line-to-line and line-to-neutral voltages of each mode are given in FIG. 7. If the six switches are turned on and off in these six modes sequentially and each mode is maintained for one sixth of the fundamental cycle of the alternator 106, the voltages at the output connections 110, 112, 114 of the three phase stator winding 116 of the alternator 106 will have the waveforms shown in FIG. 8.

Figure 7:
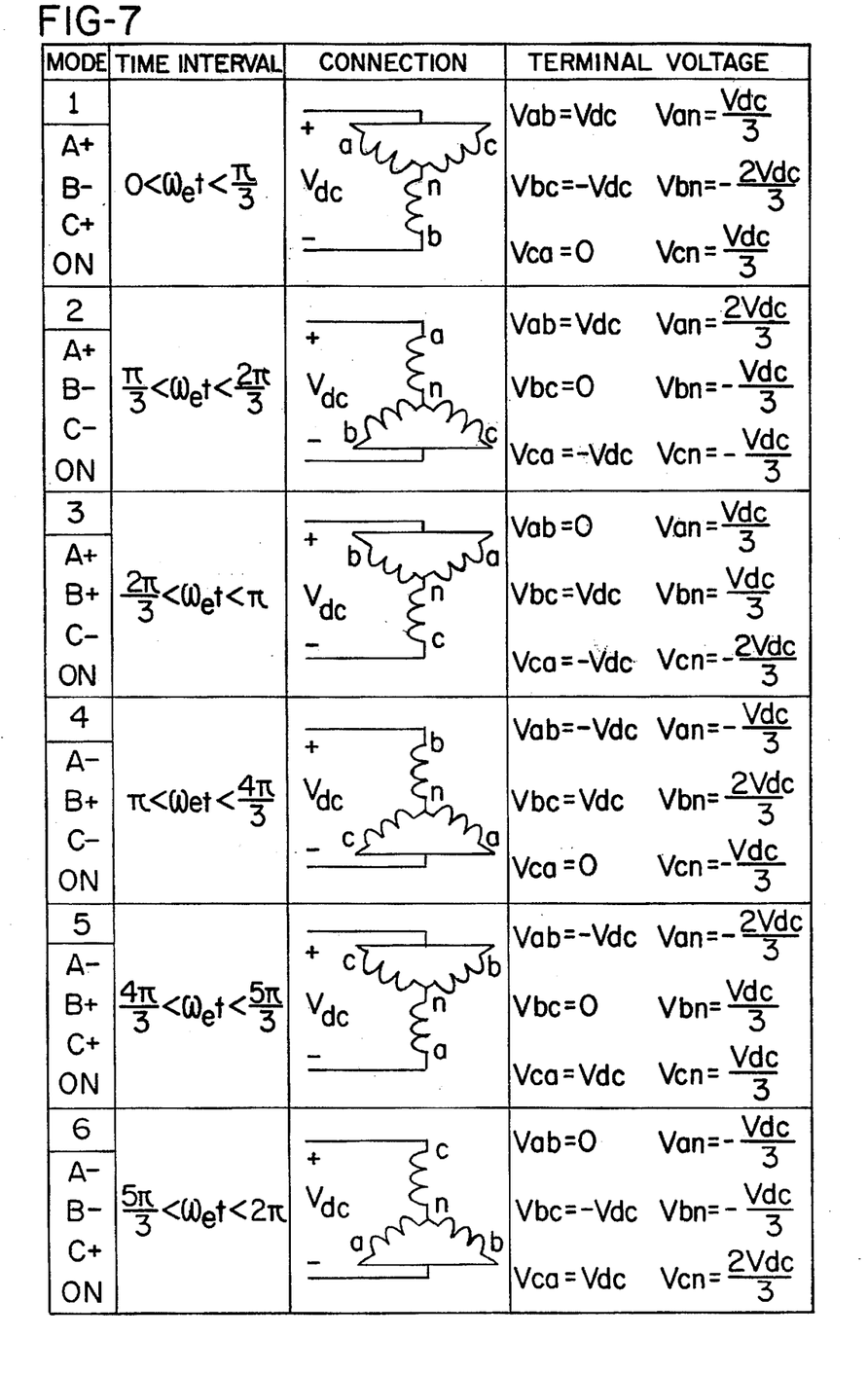
FIG. 7 is a table illustrating six switching modes used for six-step control of corresponding connections of a full wave controlled rectifier bridge, and the line-to-line and line-to-neutral voltages of each mode.
Figure 8:
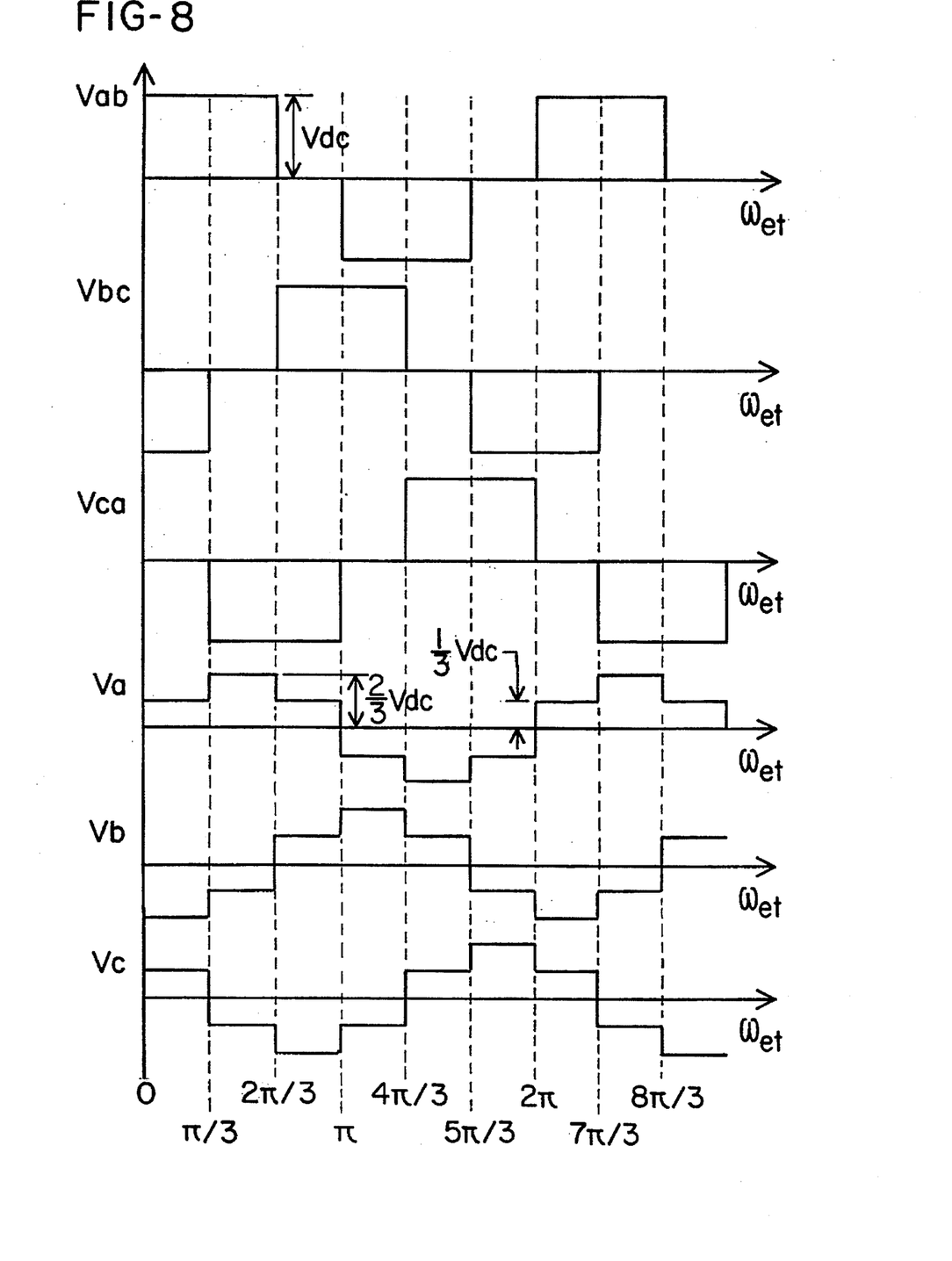
FIG. 8 is a series of graphs illustrating six-step control of a full wave controlled rectifier bridge.

It is known that three phase ac voltages can be synthesized from a dc voltage as long as the switching modes 1–6 shown in FIG. 7 are changed sequentially among the six switching modes. In like manner, the battery 102 and load 104 can be connected to the three phase ac voltages generated at the output connections 110, 112, 114 of the three phase stator winding 116 of the alternator 106 by the six switches of the bridge 108 such that a dc current 118 flows from the alternator 106 to the battery 102 and load 104 again provided that the switching modes 1–6 shown in FIG. 7 are changed sequentially among the six switching modes.

The timing for the change of switching modes or states is chosen such that the bridge 108 is synchronous with the three phase ac voltages generated at the output connections 110, 112, 114 of the stator winding 116. The synchronization of the bridge 108 with the three phase ac voltages can be performed with a minimum amount of information regarding the back EMF, i.e., the synchronous frequency of the alternator 106, as will be described with respect to a variety of control strategies for switching the states of the connections through the bridge 108.

The objective of all of these control strategies is to determine and set a desired phase shift between the ac terminal phase voltage at the output connections 110, 112, 114 of the alternator 106 and its associated back EMF. Maintaining a phase shift between a phase current and its associated phase voltage is equivalent as should be apparent and as indicated in several of the strategies. Such control dramatically increases output performance of the alternator 106, particularly at low speeds, without increasing the volume or weight of the alternator. In addition, overvoltage, for example due to load dump, can be controlled and the conventional voltage regulation function can be performed by proper control of the bridge 108.

A first strategy utilizes an angular position encoder 120 connected to a rotor output shaft 122 to determine the position of the rotor output shaft 122 and thereby the back EMF in the three phase stator winding 116. The resulting information is used in conjunction with a look-up table stored in a memory of a microprocessor 124 to determine and set the delay angle for the terminal voltages and hence the switch times for the switches of the bridge 108.

In the illustrated embodiment, the switch times are read out as an input for a counter 126 which is down-counted to generate a switch pulse for a state machine 128 which in response activates driver circuits 130 for controlling the conduction state of the switches of the bridge 108. A lockout circuit 132, illustrated as a lockout counter coupled to the state machine 128, ensures that two switches in the same leg of the bridge 108, e.g. $A^+$, $A^-$, are never turned on at the same time. In a working embodiment of the present invention, an 80C196 microprocessor was used as the microprocessor 124 and an Altera EPLD state machine was used as the state machine 128; however, a large variety of microprocessors and state machines can be utilized in the present invention.

A second strategy utilizes a zero-crossing detector 134 for a phase current. The resulting position detection is utilized by the microprocessor 124 to introduce a desired delay angle between the detection of the zero-crossing of the phase current and the application of the terminal voltage, i.e. the timing of the state transitions of the switches in the bridge 108. As previously noted, control of this angle is analogous to control of the angle between the back EMF and the terminal voltages.

A third strategy, which is currently preferred, is to combine the three phase voltages and the neutral N from the stator winding 116 within a third harmonic detector circuit 136 to determine the third harmonic within the voltage generated by the alternator 106. The resulting third harmonic signal is converted to a square wave and passed to a counter circuit 138 which generates a fundamental frequency output pulse for each six pulses of the third harmonic signal which replaces the output signal from the angular position encoder 120. For this third harmonic control strategy, a startup and synchronization circuit 140 receives one phase arbitrarily designated as phase A and the third harmonic signal from the third harmonic detector circuit 136 to generate a startup and synchronization signal corresponding to and identifying the negative to positive zero-crossings of phase A which is passed to the state machine 132.

The startup and synchronization signal enables and ensures that the switches $A^+$, $B^+$ and $C^+$ are turned on at the appropriate time signaled by the switch pulse from the counter 126 for the negative to positive zero-crossings of phase A. The switch modes are then sequentially advanced from mode 1 to mode 6 as shown in FIG. 7 at one sixth intervals of the EMF cycle. The synchronous frequency changes as the alternator speed changes and it is important to keep the switches of the bridge 108 in synchronism with the machine. This is done by updating the back EMF cycle and keeping the duration time of each switching mode equal to one sixth of the current back EMF cycle. A phase current detector 142 could also be used with the third harmonic detector 136. In addition, a dc link current sensor 144 can be used as feedback to the microprocessor 124 to form a closed loop control for power optimization from the alternator 106.

In a fourth strategy, the phase current detector 142 and a phase voltage detector 146 can be used to estimate the position of the back EMF from the determined phase current and voltage. This estimate results in an existing delay angle between the phase current and voltage which is compared to a desired delay angle read from an empirically determined look-up table. The delay angle between the phase current and voltage is then adjusted until the estimated delay angle and the desired delay angle match one another.

As noted above, the output of the alternator 106 can be controlled by controlling the angle between the back EMF and the terminal voltage of each phase. Fortunately, the relationship between the angle and the output current is simple: the bigger the angle, but not bigger than 90°, the higher the output. Therefore, if it is necessary to increase the output, the angle is increased and, if it is necessary to decrease the output, the angle is decreased. These adjustments can be made by adding or subtracting delay increments such that the desired output is reached over a number of cycles of the alternator output. After the output current reaches the demanded value, the delay is maintained until another change is necessary.

It is noted that to increase the output current, the switching mode change is delayed rather than advanced as suggested by the noted current control strategy. This is due to the fact that the variables under direct control are the terminal voltages rather than the phase currents because the battery is a voltage source. To increase the output current the machine terminal voltages should be delayed so that the angle between the back EMF and the voltages can be increased. Advancing the change of switching mode is going in the opposite direction.

As noted above, the terminal voltage frequency determined by the switches of the bridge. 108 must be the same as the synchronous frequency of the alternator 106. If the synchronous frequency is known, the terminal voltage frequency can be guaranteed to be the same as the synchronous frequency by keeping the duration time of each switching mode equal to one sixth of the synchronous cycle and changing the switching mode according to the sequence given in FIG. 7. To determine the synchronous frequency, the third harmonic detector 136 may be used because the information about the synchronous frequency is contained in the third harmonic voltage. Thus, by detecting the zero-crossing of the third harmonic voltage, which can be easily obtained by adding three phase voltages together, the synchronous frequency can be determined. If the alternator speed changes, the frequency of the third harmonic voltage also changes, which in turn changes the timing of the switching of the mode of the connections of the bridge 108 so that the terminal voltage frequency follows the back EMF frequency.

While it is possible to select an optimum delay angle for operation of an alternator in accordance with the present invention, to avoid such problems as machine parameter variation, model deficiency, and difficulties in load prediction, it is preferred to make no attempt to predict the optimum value of the angle for the required output and try to achieve that optimum value. Rather, closed loop control is preferred. The feedback variable is the battery voltage and the control law is simple: increase the angle if the battery voltage is lower than the given bottom limit or decrease the angle if the battery voltage is higher than the set upper limit. As stated above, the angle control can be accomplished by controlling the duration time of each switching mode.

It is preferred to change the angle smoothly and the amount changed in one step is empirically determined for a given alternator line. The transition period, during which the duration times of the switching modes are not equal to one sixths of the cycle of the back EMF, is ended if the battery voltage is brought back to the allowed range. The closed loop will force the angle between the back EMF and the phase voltage to be the required value for the load, even though it is unknown.

The machine yields maximum output when the angle between the back EMF and the phase voltage reaches the optimum angle, for a machine with uniform air-gap the optimum angle is 90° and for a salient pole machine the optimum angle is smaller than 90 degrees. It is necessary to detect whether the machine has reached its maximum output operation point. However, the angle is difficult to measure without a position sensor. To detect the maximum output operation point, a current sensor is used to measure the dc link current. If the measured dc link current increases as the angle increases, the angle has not reached the optimum angle and the output of the machine can still be increased by increasing the angle. If the measured dc link current decreases as the angle increases, the angle has become larger than the optimum angle and the output of the machine will decrease if the angle is further increased.

Since the controlled bridge increases the current of the alternator 106, the alternator 106 will have higher losses. If the cooling conditions limit the current to a value lower than the maximum output current, which is electromagnetically possible, the dc link current sensor is used to detect the maximum current operation point. The angle can then be held to less than the corresponding angle to protect the machine if the measured current has reached the current limit, which is determined by the cooling conditions.

For a system with a full wave controlled rectifier bridge such as the bridge 108, the increase in the output current is achieved with a penalty: the output power factor is smaller than unity. To avoid unnecessary penalty, the controlled bridge is not activated until the field current reaches its maximum value. Until that time, all six switches of the bridge 108 are turned off and the body diodes of the six MOSFETs $A^+$, $A^-$, $B^+$, $B^-$, $C^+$, $C^-$ operate as a conventional diode bridge for the alternator 106. Also, when the current needs to be reduced, the power factor angle should be reduced first to reduce the reactive current component. The field current will not be decreased until the power factor has reached unity and the controlled rectification performed by the bridge 108 is terminated. The power factor angle can be estimated by the output current. If the output current is larger than the output current of a diode bridge for the given speed and field current, the power factor angle is greater than zero.

Figure 9:
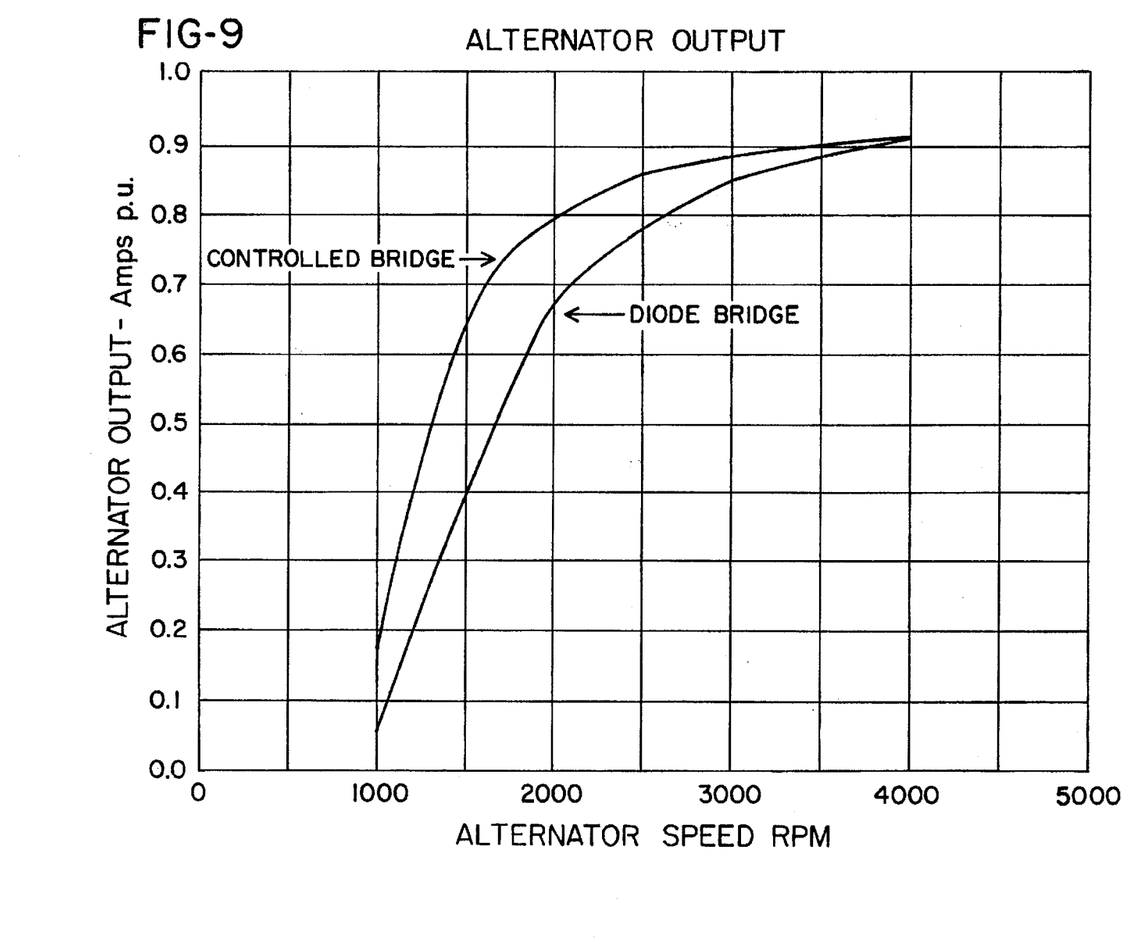
FIG. 9 is a graphically representation of the improvement of alternator performance in accordance with the present invention.

In summary, the present invention replaces a conventional full wave diode bridge with a full wave bridge having controlled switches which are parallel connected with inverse diodes as shown in FIG. 6. The MOSFETs can be thought of as controlled switches overlaying a conventional diode bridge but with the body diodes of the MOSFETs forming the conventional diode bridge. When phase control is initiated as described above, the controlled switches preempt natural commutation of the diodes and shift the phase of the alternator phase voltages relative to the phase currents. The phase angle control disrupts the normal unity power factor operation of the alternator and causes additional reactive current flow in the stator winding 116 that is sourced by the bridge 108. The result is that for the same operating conditions the controlled switches of the bridge 108 boost output from the alternator by from 40% to 60% as shown in FIG. 9.

Having thus described the invention of the present application in detail and by reference to preferred embodiments thereof, it will be apparent that modifications and variations are possible without departing from the scope of the invention defined in the appended claims.

What is claimed is:

1. An alternator mechanically driven to generate a dc power at a dc output comprising:

a three phase stator winding having three output connections;

a rotor magnetically coupled to said stator winding and mechanically driven to generate a back electromotive force in said stator winding and thereby produce three phase power at said three output connections of said stator winding;

apparatus for determining the position of said back electromotive force in said stator winding comprising a first detector for measuring current in one phase of said three phase stator winding and a second detector for measuring voltage of said one phase of said three phase stator winding;

a full wave controlled rectifier bridge connected between said three output connections of said stator winding and said dc output; and a controller responsive to said back electromotive force in said stator winding for controlling said full wave controlled rectifier bridge to control phase shift between said back electromotive force in said stator winding and phase voltages at said three output connections of said stator winding.

2. An alternator as claimed in claim 1 wherein said phase shift between said back electromotive force in said stator winding and phase voltages at said three output connections of said stator winding is maintained at a preferred value to increase alternator output current.

3. An alternator as claimed in claim 1 wherein said full wave controlled rectifier bridge is constructed of MOSFET devices.

4. An alternator as claimed in claim 1 wherein said alternator is mechanically driven by an internal combustion engine of a motor vehicle to charge a battery of said motor vehicle and operate equipment of said motor vehicle.

5. A method of operating an alternator to generate dc power at a dc output, said alternator including a three phase stator winding having three output connections and a rotor magnetically coupled to said stator winding and mechanically driven to generate a back electromotive force in said stator winding and thereby produce three phase power at said three output connections of said stator winding, said method comprising the steps of:

determining the position of said back electromotive force in said stator winding comprises the steps of:
   measuring current in one phase of said three phases; and
   measuring voltage of said one phase of said three phases;

connecting a full wave controlled rectifier bridge between said three output connections of said stator winding and said dc output; and controlling said full wave controlled rectifier bridge to control phase shift between said back electromotive force in said stator winding and phase voltages at said three output connections of said stator winding in response to said back electromotive force in said stator winding.

6. A method of operating an alternator as claimed in claim 5 further comprising the step of coupling said alternator to an internal combustion engine of a motor vehicle such that said alternator is mechanically driven by said internal combustion engine to charge a battery of said motor vehicle and operate equipment of said motor vehicle.

* * * * *